United States Patent
Toriihara et al.

(10) Patent No.: US 11,679,496 B2
(45) Date of Patent: Jun. 20, 2023

(54) ROBOT CONTROLLER THAT CONTROLS ROBOT, LEARNED MODEL, METHOD OF CONTROLLING ROBOT, AND STORAGE MEDIUM

(71) Applicant: CANON KABUSHIKI KAISHA, Tokyo (JP)

(72) Inventors: Shigeru Toriihara, Kanagawa (JP); Yuki Wada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 326 days.

(21) Appl. No.: 17/106,785

(22) Filed: Nov. 30, 2020

(65) Prior Publication Data
US 2021/0170579 A1 Jun. 10, 2021

(30) Foreign Application Priority Data
Dec. 9, 2019 (JP) .............................. JP2019-222170

(51) Int. Cl.
*B25J 9/16* (2006.01)
*G05B 19/4155* (2006.01)
*G06N 3/063* (2023.01)

(52) U.S. Cl.
CPC ............... *B25J 9/161* (2013.01); *B25J 9/163* (2013.01); *B25J 9/1697* (2013.01);
(Continued)

(58) Field of Classification Search
CPC .......... B25J 9/161; B25J 9/163; B25J 9/1697; G05B 19/4155; G05B 2219/39284;
(Continued)

(56) References Cited

U.S. PATENT DOCUMENTS 6,169,981 B1 * 1/2001 Werbos .............. G05B 13/0285
706/26
7,590,589 B2 * 9/2009 Hoffberg .............. G06Q 20/308
705/37

(Continued)

OTHER PUBLICATIONS

Florensa et al, Automatic Goal Generation for Reinforcement Learning Agents, ICML, 2018, Proceedings of the 35th International Conference on Machine Learning, Stockholm, Sweden, PMLR 80:1515-1528 (Year: 2018).*

(Continued)

*Primary Examiner* — Jaime Figueroa
(74) *Attorney, Agent, or Firm* — Rossi, Kimms & McDowell LLP (57) ABSTRACT

A robot controller that controls a robot by automatically obtaining a controller capable of suitably controlling a wide range of robots. An image is acquired from an image capturing apparatus that photographs an environment including the robot. The robot is driven based on an output result obtained by inputting the image to a neural network. The neural network is updated according to a reward generated in a case where a plurality of virtual images photographed while changing an environmental condition of a virtual environment generated by virtualizing the environment and a state of a virtual robot are input to the neural network, and a policy of the virtual robot, which is output from the neural network, satisfies a predetermined condition.

18 Claims, 6 Drawing Sheets

(52) U.S. Cl.
CPC ......... *G05B 19/4155* (2013.01); *G06N 3/063* (2013.01); *G05B 2219/39284* (2013.01)

(58) Field of Classification Search
CPC ........... G05B 2219/39271; G05B 2219/40604; G06N 3/063; G06N 3/0445; G06N 3/0454; G06N 3/084
USPC ................ 700/245–264; 318/568.11–568.25
See application file for complete search history.

(56) References Cited

U.S. PATENT DOCUMENTS

| | | | | |
|---|---|---|---|---|
| 8,775,341 | B1 * | 7/2014 | Commons | G06N 3/08 706/20 |
| 8,873,813 | B2 * | 10/2014 | Tadayon | G06V 40/172 382/118 |
| 9,311,670 | B2 * | 4/2016 | Hoffberg | G06Q 20/0652 |
| 11,515,030 | B2 * | 11/2022 | Mansi | G16H 20/40 |
| 2006/0167784 | A1 * | 7/2006 | Hoffberg | G06Q 20/401 705/37 |
| 2010/0235285 | A1 * | 9/2010 | Hoffberg | G06Q 20/308 705/37 |
| 2014/0079297 | A1 * | 3/2014 | Tadayon | G06V 40/172 382/118 |
| 2016/0224951 | A1 * | 8/2016 | Hoffberg | G06Q 20/10 |
| 2017/0337682 | A1 * | 11/2017 | Liao | A61B 5/7267 |
| 2019/0333626 | A1 * | 10/2019 | Mansi | A61B 5/7267 |
| 2020/0215695 | A1 * | 7/2020 | Cristache | G06N 5/04 |

OTHER PUBLICATIONS

Plappert et al., Multi-Goal Reinforcement Learning: Challenging Robotics Environments and Request for Research, arXiv preprint arXiv:1802.09464 (2018). (Year: 2018).*

Tobin "Domain Randomization for Transferring Deep Neural Networks from Simulation to the Real World" arXiv:1703.06907v1. Mar. 20, 2017. Cited in the specification.

Jaderberg "Reinforcement Learning With Unsupervised Auxiliary Tasks" arXiv:1611.05397v1. Nov. 16, 2016: pp. 1-14 Cited in the specification.

* cited by examiner

ROBOT CONTROLLER THAT CONTROLS ROBOT, LEARNED MODEL, METHOD OF CONTROLLING ROBOT, AND STORAGE MEDIUM

BACKGROUND OF THE INVENTION

Field of the Invention

The present invention relates to a robot controller that controls a robot, a learned model, a method of controlling a robot, and a storage medium.

Description of the Related Art

One example of a scene in which a robot is used is a factory. In this case, the robot is controlled by a controller under a guaranteed environment, i.e. the factory. The controller is made by a robotics engineer having expertise. On the other hand, in recent years, the scene in which a robot is used has been diversifying. For example, robots are used e.g. for customer service in stores and cleaning in homes. For such using scenes, it is difficult to guarantee a using environment of the robot and further to make robotics engineers available who have expertise. A related art has been proposed in Open AI, [Domain Randomization for Transferring Deep Neural Networks from Simulation to the Real World], Mar. 20, 2017, [Online][search on Apr. 15, 2019], the Internet https://arxiv.org/pdf/1703.06907.pdf. This technique deals with a task of picking a work with an arm of a robot, using a camera. Further, according to the above-mentioned technique, a convertor is generated which calculates the position and posture of a work from an image photographed using the camera, by performing deep learning in a virtual environment. In the virtual environment, there are arranged a virtual arm, a virtual work, a virtual camera, virtual illumination light, etc., which are generated by virtualizing an environment including the robot in a real space. Then, learning is performed using artificial neural networks and a large amount of teacher data. Further, a related art using CNN and LSTM has been proposed in DeepMind, [Reinforcement Learning with Unsupervised Auxiliary Tasks], Nov. 16, 2016, [Online], [search on Apr. 15, 2019], the Internet <https://arxiv.org/abs/1611.05397.pdf>.

In the first-mentioned related art, the position and posture of a work are calculated from an image photographed by the camera, using an artificial neural network (model) formed by three layers or more, which is generated by deep learning. Therefore, this technique is not suitable for a controller of a robot that picks a work whose position and posture cannot be defined, such as cloth and liquid. Further, in this technique, driving of the arm after calculating the position and posture of a work is performed based on inverse kinematics and an operation plan. In the inverse kinematics, phases of driving shafts of the arm are estimated based on the dimensions of portions of the arm of the robot, the positions of tip ends of the portions, and the posture of the arm. Further, the operation plan is a method of sequentially selecting solutions to inverse kinematics problems such that the arm of the robot achieves a desired posture without being brought into contact with any of the robot itself, an obstacle, etc.

Here, the inverse kinematics does not give only one solution, and further, the driving of the arm based on the inverse kinematics and the operation plan can cause an error. For example, in a case where dimensional errors of the arm are large, a case where the rigidity of the arm is low, a case where a measurement error of a phase of the drive shaft is large, or the like, an error in estimation based on the inverse kinematics becomes large. For this reason, the first-mentioned related art is not suitable for a task required to drive the arm with high accuracy, such as a task of picking up a small work. Therefore, there is a case where it is impossible to suitably control a robot using this technique depending on the type of a work or the type of the robot.

SUMMARY OF THE INVENTION

The present invention provides a robot controller that controls a robot by automatically obtaining a controller capable of suitably controlling a wide range of robots, a learned model, a method of controlling a robot, and a storage medium.

In a first aspect of the present invention, there is provided a robot controller that controls a robot, including at least one processor or circuit configured to perform the operations of the following units an acquisition unit configured to acquire an image from an image capturing apparatus that photographs an environment including the robot, and a driving unit configured to drive the robot based on an output result obtained by inputting the image to a neural network, wherein the neural network is updated according to a reward generated in a case where a plurality of virtual images photographed while changing an environmental condition of a virtual environment generated by virtualizing the environment and a state of a virtual robot are input to the neural network, and a policy of the virtual robot, which is output from the neural network, satisfies a predetermined condition.

In a second aspect of the present invention, there is provided a learned model that is acquired by updating a neural network according to a reward generated in a case where a plurality of virtual images photographed while changing an environmental condition of a virtual environment generated by virtualizing an environment including a robot and a state of a virtual robot are input to the neural network, and a policy of the virtual robot, which is output from the neural network, satisfies a predetermined condition.

In a third aspect of the present invention, there is provided a method of controlling a robot, comprising acquiring an image from an image capturing apparatus that photographs an environment including the robot, driving the robot based on an output result obtained by inputting the image to a neural network, and updating the neural network according to a reward generated in a case where virtual images photographed while changing an environmental condition of a virtual environment generated by virtualizing the environment and a state of a virtual robot are input to the neural network, and a policy of the virtual robot, which is output from the neural network, satisfies a predetermined condition.

In a fourth aspect of the present invention, there is provided a non-transitory computer-readable storage medium storing a computer-executable program for executing a method of controlling a robot, wherein the method comprises acquiring an image from an image capturing apparatus that photographs an environment including the robot, driving the robot based on an output result obtained by inputting the image to a neural network, and updating the neural network according to a reward generated in a case where virtual images photographed while changing an environmental condition of a virtual environment generated by virtualizing the environment and a state of a virtual robot are input to the neural network, and a policy of the virtual robot, which is output from the neural network, satisfies a predetermined condition.

According to the present invention, it is possible to control a robot by automatically obtaining a controller capable of suitably controlling a wide range of robots.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. However, the following description of the configuration of an embodiment is given only by way of example and is by no means intended to limit the scope of the present invention.

The present embodiment is applied to generation of a controller that controls a robot. Note that the following description is given assuming that the controller performs a task in which an arm of a robot picks up a work using an image photographed by a camera. However, the present embodiment can be applied to a desired task other than the task of picking a work and can be applied to various robots.

Figure 1A:
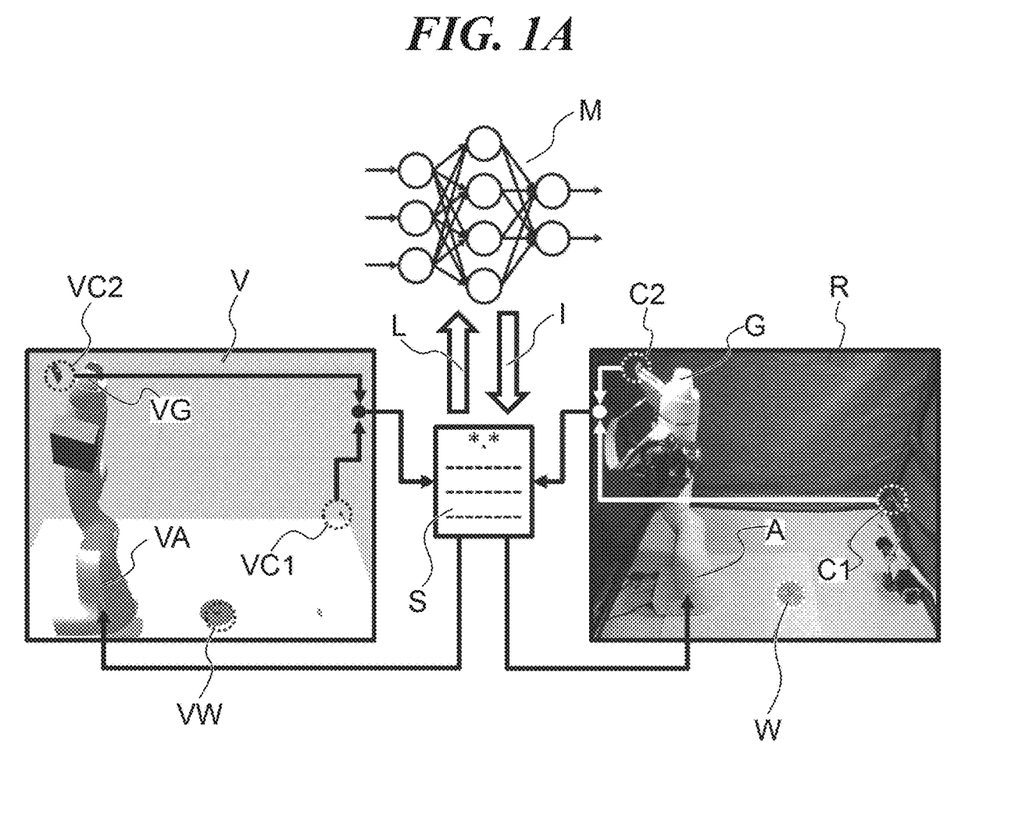
FIGS. 1A and 1B are diagrams showing an outline of a robot controller.
Figure 1B:
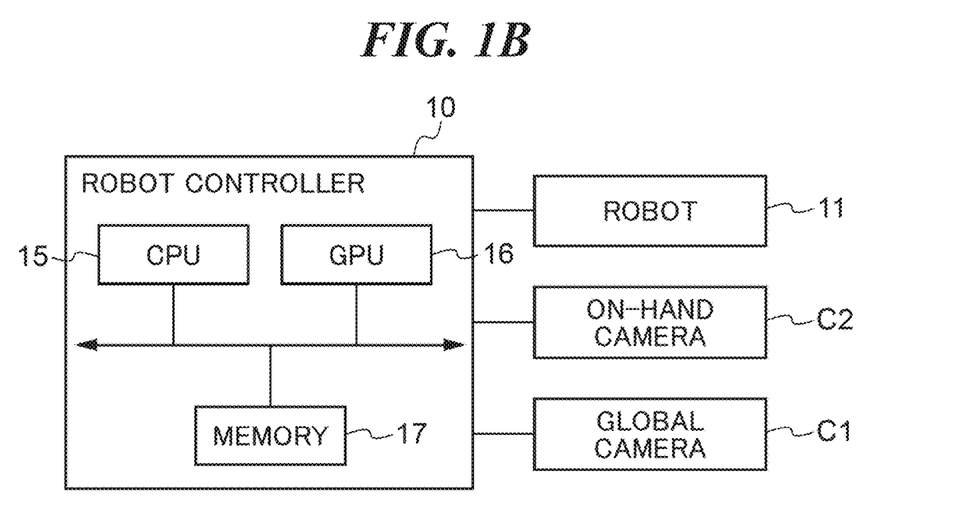

FIGS. 1A and 1B are diagrams showing an outline of a robot controller according to the present embodiment. FIG. 1A is a diagram showing an environment and a flow of data when generating a controller of a robot. FIG. 1A shows a real environment R, a virtual environment V, a model M, and a script S. The real environment R in FIG. 1A includes an arm A, a work W, a global camera C1, and an on-hand camera C2. The real environment R further includes illumination light, a darkroom, etc. The real environment R is a real space. The arm A is an arm of a robot 11, described hereinafter, and a gripper G is mounted to a tip end of the arm A. The arm A has e.g. a multi-joint structure. The gripper G is a grip portion that is capable of gripping the work W. When the arm A is operated in a state in which the gripper G is gripping the work W, the work W is lifted up. The gripper G may have a portion that scoops liquid, for example. The gripper G may be integrally formed with the arm A. Further, the arm A and the robot 11 may be an integrally formed as a robot arm or may be separately provided.

The global camera C1 is capable of photographing the full view including substantially the entire body of the arm A and the work W. The on-hand camera C2 is disposed in the vicinity of the gripper G of the arm A and is capable of photographing substantially the entire body of the gripper G and an area around the gripper G. The global camera C1 is capable of substantially always photographing the work W but is incapable of photographing the work W when the arm A hides the work W. The on-hand camera C2 is limited in the state capable of photographing the work W, but is capable of closely photographing the work W in a state in which the gripper G faces the work W and the distance between the gripper G and the work W is small. Therefore, the global camera C1 and the on-hand camera C2 cooperate to reduce blind spots. Further, based on an image photographed by the on-hand camera C2, the arm A can be precisely driven before and after the gripper G grips the work W. The global camera C1 and the on-hand camera C2 are image capturing apparatuses. There may be provided one camera as the image capturing apparatus.

The virtual environment V is a physical simulator generated by virtualizing the real environment R. The virtual environment V includes a virtual arm VA, a virtual gripper VG, a virtual work VW, a virtual global camera VC1, and a virtual on-hand camera VC2, in association with the real environment R. The virtual environment V further includes virtual illumination light, etc. The virtual arm VA corresponds to the arm A, the virtual gripper VG to the gripper G, the virtual work VW to the work W, the virtual global camera VC1 to the global camera C1, and the virtual on-hand camera VC2 to the on-hand camera C2. The virtual global camera VC1 and the virtual on-hand camera VC2 are virtual image capturing apparatuses, and an image photographed by the virtual image capturing apparatus is a virtual image. It is desirable that the specifications of the virtual environment V including its appearance are made similar to the real environment R as much as possible. Objects, such as the virtual arm VA, can act on each other within a range of physical phenomena installed in the physical simulator. For example, in the virtual environment V, the virtual gripper VG can grip the virtual work VW and the virtual arm VA can lift up the virtual work VW gripped by the virtual gripper VG.

The model M is an artificial neural network (hereinafter simply referred to as the neural network) that is formed by neurons and synapses, and has a layered structure formed by three layers or more. Details of the model M will be described hereinafter. The model M is a learned model obtained by deep reinforcement learning and corresponds to a controller suitable for the control of the arm A of the real robot 11.

The script S is a script written in a script language. Installation of the model M using a learning framework is described in the script S. Further, in the script S, photographing instructions to the global camera C1 and the on-hand camera C2 and processing for connecting photographed images are also described. Further, in the script S, a driving instruction to the arm A and processing operations for acquiring respective states of driving shafts of the arm A and a state of the gripper G are also described. Similarly, in the script S, processing operations performed for the virtual arm VA, the virtual gripper VG, the virtual global camera VC1, and the virtual on-hand camera VC2 are also described. The script S is a program responsible for linking between a plurality of systems, such as a learning framework, a virtual environment, and a real environment. As the programming language for describing the script S, the glue language is suitable.

Next, a flow of data occurring when the reinforcement learning is performed in the virtual environment V will be described. The reinforcement learning is a method of machine learning for generating an action selection criterion (policy) that maximizes a reward obtained as a result of trials repeated by an agent placed in an environment. In the virtual environment V, images photographed by the virtual global camera VC1 and the virtual on-hand camera VC2 are connected and sent to the script S as one image. The script S inputs the received image to the model M and obtains a policy as an output. The policy refers to a set of a plurality of actions and respective selection probabilities of the actions. The sum of the selection probabilities is adjusted to be equal to "l". The script S determines a controlled variable of the virtual arm VA based on the obtained policy. The script S sends the determined controlled variable to the virtual arm VA. The virtual arm VA changes the posture of the virtual arm VA of the virtual robot according to the received controlled variable. In the virtual environment V, a reward is sometimes generated due to a change of the posture of the virtual arm VA. When generation of a reward is detected, the script S updates the model M. The update of the model M based on the generated reward is referred to as learning L. In the present embodiment, the deep reinforcement learning is applied as the learning L. Described above is the learning process in the virtual environment V.

Next, a flow of data occurring when reasoning is performed in the real environment R will be described. Images photographed by the global camera C1 and the on-hand camera C2 are connected to each other and the resulting image is sent to the script S. The script S inputs the received image to the model M and obtains a policy as an output. The process for inputting an image photographed in the real environment R to the model M and obtaining a policy is referred to as reasoning I of the model M. The script S determines a controlled variable of the arm A based on the obtained policy. The script S sends the determined controlled variable to the arm A. The arm A changes its posture according to the received controlled variable. Described above is the reasoning process in the real environment R.

FIG. 1B is a diagram showing the configuration of the system of the present embodiment. The configuration of the system of the present embodiment is not limited to the example shown in FIG. 1B. A robot controller 10 controls driving of the robot 11 to which the arm A is mounted. Further, to the robot controller 10, the global camera C1 and the on-hand camera C2 are connected. The robot controller 10 includes a CPU 15, a GPU 16, and a memory 17. The CPU 15 is a processor that executes processes of the present embodiment and corresponds to an acquisition unit and a driving unit. The GPU 16 is a graphics processing unit mainly used when calculation is performed by the model M. A semiconductor circuit specific to the machine learning process may be used in place of the GPU 16. The memory 17 stores programs executed by the CPU 15. The script S is stored in the memory 17. The CPU 15 executes the contents described in the script S, whereby the processes of the present embodiment are realized. The robot controller 10 may be a single device or may be incorporated in the robot 11.

Although the following description is given assuming that the CPU 15 realizes a physical simulator, the physical simulator may be realized by a simulator device different from the CPU 15 of the robot controller 10. In this case, the simulator device and the robot controller 10 are communicably connected to each other. Further, the calculation and update of the model M may be performed not by the GPU 16 of the robot controller 10, but by a predetermined processor. For example, an edge computer, a cloud server, or the like may perform the calculation and update of the model M. In this case, the predetermined processor and the robot controller 10 are communicably connected to each other.

Figure 2:
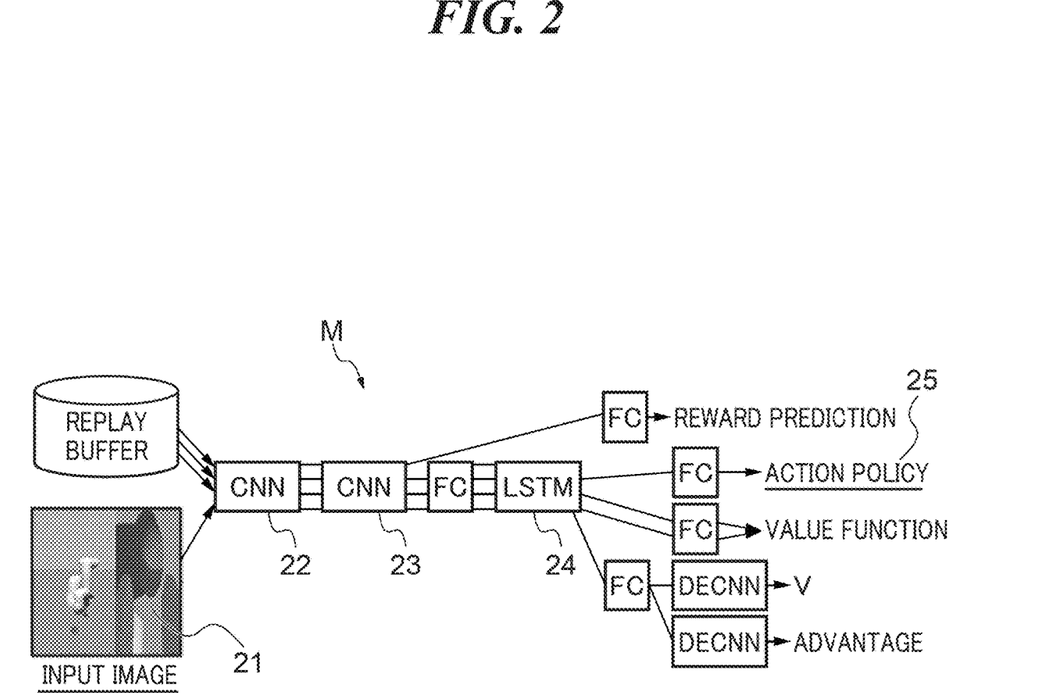
FIG. 2 is a diagram showing a model.

FIG. 2 is a diagram of the model M. An image 21 is input to the model M. When the reinforcement learning in the virtual environment V is performed, an image generated by connecting an image photographed by the virtual global camera VC1 and an image photographed by the virtual on-hand camera VC2 is input as the image 21, and noise is applied to the image 21. When the reasoning in the real environment R is performed, an image generated by connecting an image photographed by the global camera C1 and an image photographed by the on-hand camera C2 is input as the image 21. The model M has two CNNs 22 and 23. The CNN is a convolutional neural network and is suitable for generation of an image processor. The CNN 22 and the CNN 23 are connected to each other, and a fully connected layer FC is connected to an output of the CNN 23. LSTM 24 is connected to an output of the fully connected layer FC.

The LSTM is a kind of a recurrent neural network (recursive neural network) and is suitable for generation of a sequence processor. The sequence process is a process for dividing time-series data and character strings into desired units and extracting meanings. The LSTM is suitable e.g. for voice recognition and character string recognition. When the image 21 is input to the CNN 22, a policy 25 is output after processing by the CNN 23, the FC, and the LSTM. In FIG. 2, the policy 25 is denoted as "Action Policy". Other elements and inputs/outputs appearing in FIG. 2 act so as to recognize a change of the input, promote the learning, and avoid acquisition of an undesirable policy. The definitions and functions related to the other elements and the inputs/outputs appearing in FIG. 2 may be based on the above-mentioned related art using the CNN and the LSTM. The model M is not limited to the example shown in FIG. 2.

Figure 3:
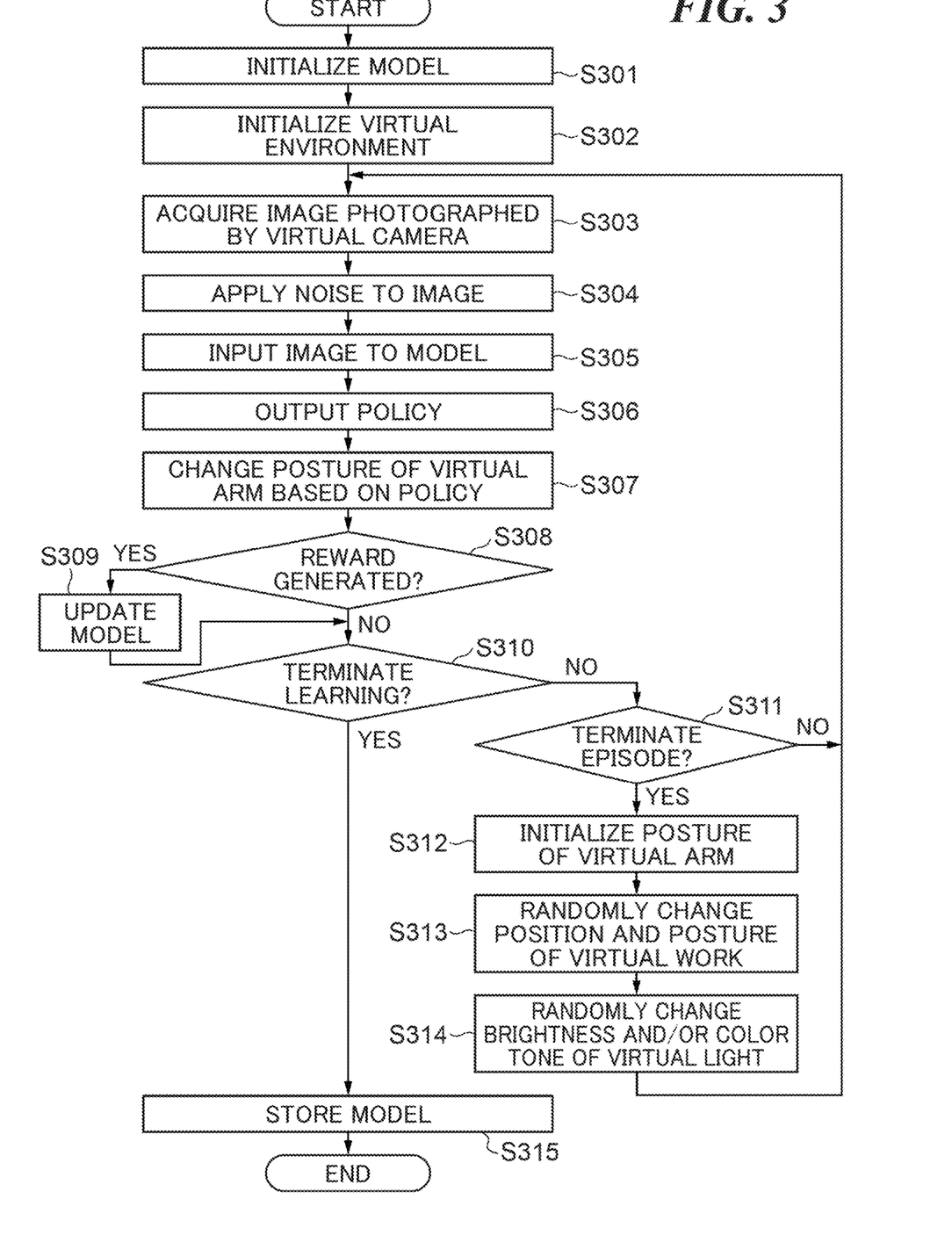
FIG. 3 is a flowchart of a learning process in a virtual environment.

FIG. 3 is a flowchart of the learning process in the virtual environment V. Processing steps in FIG. 3 are realized by the CPU 15 executing the script S stored in the memory 17. The CPU 15 initializes the model M (step S301). In the step S301, the model M is generated using a learning framework. At this time, a lot of parameters of the model M are all set to initial values. The initial values may be random values or may be determined by trial and error according to whether or not the learning thereafter can be performed or according to a learning speed.

Next, the CPU 15 initializes the virtual environment V (step S302). In the step S302, a physical simulator is started up. The CPU 15 arranges the virtual arm VA, the virtual global camera VC1, the virtual on-hand camera VC2, and the virtual work VW within the physical simulator, based on the contents described in the script S. Further, the CPU 15 disposes virtual illumination light for illuminating the virtual arm VA, etc., and other objects within the physical simulator, as required. In the step S302, the positions, postures, and textures of all objects, and the brightness and color tone of the virtual illumination light are set to initial values. The initial values may be random values or may be determined by trial and error according to whether or not the learning thereafter can be performed or according to the learning speed. However, in the step S302, it is not desirable to set the virtual environment V to an initial state departing from the laws of reality, such as the law of gravity, or to an initial state in which the task can be too easily achieved.

The CPU 15 acquires an image photographed by the virtual camera within the physical simulator (step S303). In the step S303, images photographed by the virtual global camera VC1 and the virtual on-hand camera VC2 are reduced in size and connected to each other. The CPU 15 performs processing for intentionally applying noise to the image acquired in the step S303 (step S304). Application of noise may be always performed. The processing in the step S304 is a kind of processing for randomizing conditions under which the learning is performed in the virtual environment V. Details of this processing will be described hereinafter. The CPU 15 inputs the image subjected to the processing in the step S304 to the model M (step S305).

The CPU 15 causes the GPU 16 to perform forward propagation calculation for the neural networks using the input of the image to the model M. With this, the GPU 16 outputs the policy 25 as a result of the forward propagation calculation (step S306). The policy 25 of the present embodiment refers to a set of actions of driving all movable shafts of the virtual arm VA each in a positive or negative direction by a certain amount and selection probabilities thereof. The CPU 15 performs processing for changing the posture of the virtual arm VA based on the policy 25 output in the step S306, within the physical simulator (step S307). A change of the posture, i.e. the driving of each of any of the movable shafts of the virtual arm VA in the positive or negative direction is selected in proportion to the selection probability. The CPU 15 determines whether or not a reward has been generated due to the change of the posture of the virtual arm VA (step S308). Details of reward generating conditions will be described hereinafter. If a reward has been generated, the answer to the question of the step S308 is affirmative (YES). In this case, the CPU 15 updates the model M (step S309). In the step S309, so as to increase the selection probability of the action with which the reward has been obtained, the model M is updated such that the image is changed according to the policy 25. More specifically, the parameters of the model M are adjusted. For example, the step S309 is executed by efficiently applying optimization calculation by stochastic gradient descent or the like, using e.g. backpropagation.

If the answer to the question of the step S308 is negative (NO), or if the step S309 is executed, the CPU 15 determines whether or not to terminate the learning (step S310). The CPU 15 may perform the determination in the step S310 based on whether or not a predetermined time period has elapsed or whether or not the frequency of generation of a reward is equal to or larger than a predetermined value. For example, in a case where the predetermined time period has elapsed or in a case where the frequency of generation of a reward is equal to or larger than the predetermined value, the CPU 15 may determine to terminate the teaming. Further, the CPU 15 may perform the determination in the step S310 based on whether or not an exception has occurred in the script S being executed or in the physical simulator, or based on whether or not a termination instruction has been given by a user. For example, in a case where an exception has occurred or in a case where a termination instruction has been given by a user, the CPU 15 may determine to terminate the learning. If the answer to the question of the step S310 is affirmative (YES), the CPU 15 stores the model M (step S315). Then, the learning is terminated.

If the answer to the question of the step S310 is negative (NO), the learning is not to be terminated. In this case, the CPU 15 determines whether or not to terminate an episode (step S311). The episode refers to a group of a plurality of trials performed to reach a state in which a reward is generated. The CPU 15 may determine that the episode is to be terminated when a task of the virtual arm VA acting on the virtual work VW is completed. Further, the CPU 15 may determine that the episode is to be terminated when the number of trials reaches a predetermined number of times.

If the answer to the question of the step S311 is negative (NO), the flow returns to the step S303. If the answer to the question of the step S311 is affirmative (YES), the CPU 15 initializes the posture of the virtual arm VA (step S312). In the step S312, the posture of the virtual arm VA is initialized to the same posture as that set when the step S302 is executed. Then, the CPU 15 randomly changes the position and posture of the virtual work (step S313). Further, the CPU 15 changes one or both of the brightness and color tone of the virtual illumination light (step S314). The change of the brightness of the virtual illumination light and the change of the color tone of the same are examples of changes of environmental conditions. The steps S313 and S314 are a kind of randomization of the conditions under which learning is performed in the virtual environment V and are operations for changing the state of the virtual robot. Details of these operations will be described hereinafter. The reinforcement learning in the virtual environment V is also processing for adjusting the parameters of the model M until a policy having a high possibility of generating a reward is obtained from various images.

Figure 4:
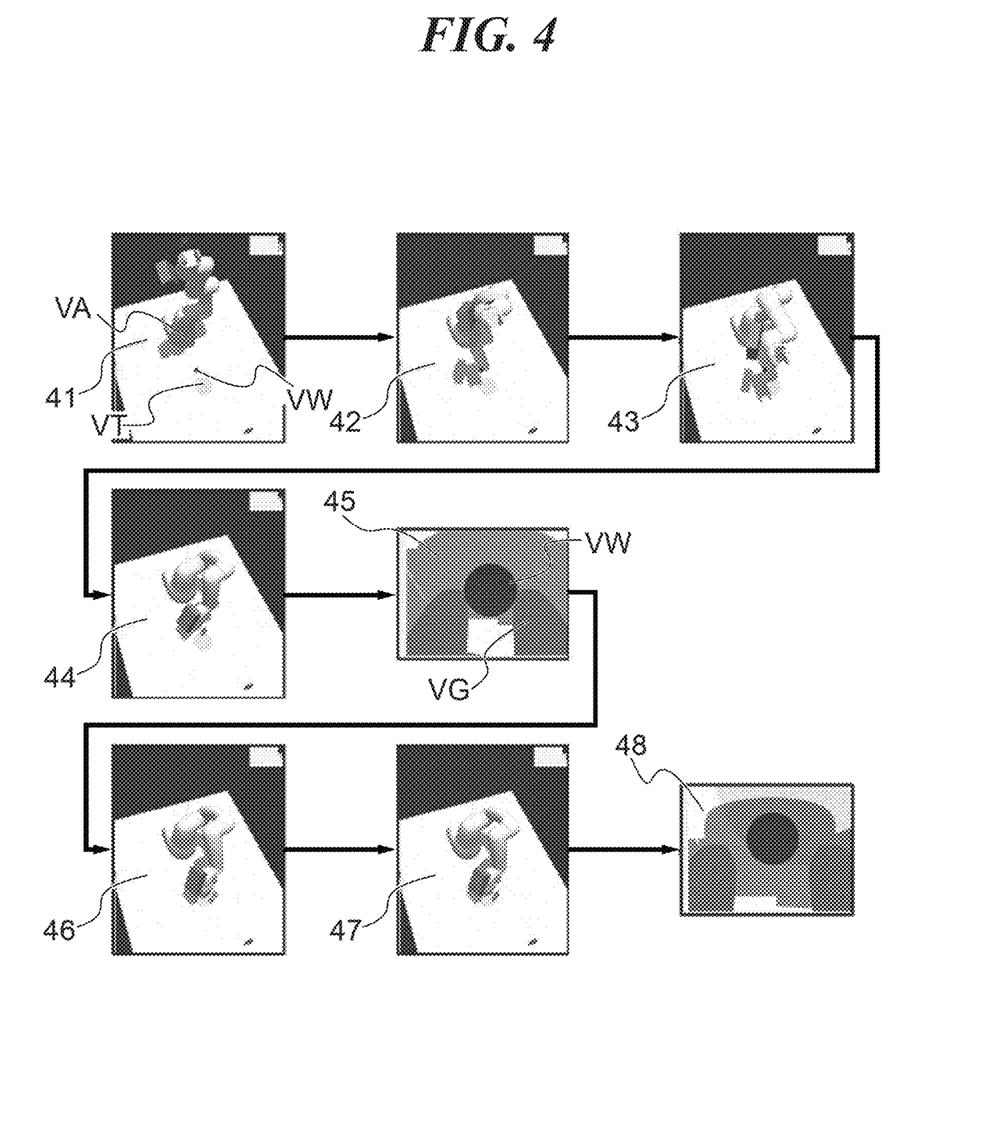
FIG. 4 is a diagram showing a plurality of reward generating conditions used when learning in the virtual environment is performed.

FIG. 4 is a diagram showing a plurality of states in which reward generating conditions are satisfied when learning is performed in the virtual environment V. In the example shown in FIG. 4, there are illustrated changes in the state of the virtual environment V from a state 41 to a state 48. The state 41 is a state in which an episode is started. In the state 41, the virtual arm VA is in the initial state, and the virtual work VW is placed on a floor. A virtual target VT is an area where the virtual arm VA finally places the virtual work VW after lifting up the virtual work VW and carrying the virtual work VW. The virtual target VT is designated e.g. by a user. The state 42 is a state satisfying a first reward generating condition. The state 41 has been changed to the state 42, the CPU 15 performs control that generates a reward. The state 42 is a state in which action selection (selection for driving the virtual work VW) using the image photographed by the virtual camera and the model M has been performed a plurality of times, and the virtual gripper VG and the virtual work VW have slightly become closer to each other from the state 41. In this case, the CPU 15 performs control that generates a reward when a distance between the virtual gripper VG and the virtual work VW becomes equal to or less than a predetermined distance. The virtual gripper VG is a virtual gripper mounted to the tip end of the virtual arm VA and is capable of gripping, lifting up, and placing the virtual work VW in a predetermined area in the virtual environment V. The virtual gripper VG corresponds to a virtual gripping portion. The virtual gripper VG may be formed integrally with the virtual arm VA.

In the present embodiment, the CPU 15 performs the control that generates a reward using the distance between the virtual gripper VG and the virtual work VW. The CPU 15 may generate a reward using a distance between the virtual arm VA and the virtual work VW. For example, the CPU 15 may add a point of 1 each time a reward is generated. The virtual environment V is different from the real environment R in that it is realized by the physical simulator, and hence it is possible to easily acquire a position and a posture of each object. For this reason, the CPU 15 can easily calculate the distance between the virtual gripper VG and the virtual work VW as well. The state 43 is a state satisfying a second reward generating condition. The state 43 is a state in which the virtual gripper VG and the virtual work VW have become still closer to each other than in the state 42. When the state 42 has been changed to the state 43, a reward is generated. The state 44 is a state satisfying a third reward generating condition. The state 44 is a state in which the virtual gripper VG and the virtual work VW have become so close to each other that the virtual gripper VG can grip the virtual work VW when the virtual gripper VG is closed. When the state 43 has been changed to the state 44, a reward is generated.

The state 45 is a state satisfying a fourth reward generating condition. In FIG. 4, the state 45 is illustrated as showing an image photographed by the virtual on-hand camera VC2. This photographed image includes the virtual gripper VG and the virtual work VW. The state 45 is a state in which the virtual arm VA closes the virtual gripper VG, and the virtual gripper VG is gripping the virtual work VW. The driving (action) for closing the virtual gripper VG is also included in the policy output from the model M. When the state 44 has been changed to the state 45, a reward is generated. The state 46 is a state satisfying a fifth reward generating condition. The state 46 is a state in which the virtual work VW gripped by the virtual gripper VG is lifted up from the floor to a predetermined height or higher by driving the virtual arm VA. This state is defined as a state in which the operation of picking the work by the arm is achieved. When the state 45 has been changed to the state 46, a reward is generated.

The state 47 is a state satisfying a sixth reward generating condition. The state 47 is a state in which a distance between the virtual work VW and the virtual target VT is reduced to a distance equal to or less than a predetermined distance by driving the virtual arm VA. When the state 46 has been changed to the state 47, a reward is generated. The state 48 is a state satisfying a seventh reward generating condition. The state 48 is a state in which the virtual gripper VG is opened, and the virtual work VW is placed within the virtual target VT on the floor. The driving (action) for opening the virtual gripper VG is also included in the policy output from the model M. This state is defined as a state in which the operation of placing the work by the arm is achieved. When the state 47 has been changed to the state 48, a reward is generated. The above-described first to seventh reward generating conditions each correspond to a predetermined condition.

When a change from the state 41 to the state 48 has been completed, the operation of picking and placing the virtual work VW by the virtual gripper VG of the virtual arm VA is achieved. In this case, one task of pick-and-place is completed. When the task of pick-and-place is completed, the answer to the question of the step S311 in FIG. 3 is affirmative (YES). The model M is updated whenever a reward is generated. With this, the updated model M outputs a policy having a higher possibility of generating a reward based on the input image. Although in the above-described example, a predetermined reward is generated in a case where any one of the first to seventh reward generating conditions (predetermined conditions) is satisfied, generation of a reward may be controlled such that a value of a reward to be generated is differentiated depending on a condition. For example, the reward generated when the picking operation is completed and the reward generated when the placing operation is completed may be made larger than the rewards generated in other states.

The virtual work VW may be not a virtual object whose position and posture can be easily defined, but e.g. virtual cloth or liquid whose position and posture cannot be defined. The above-described processes in FIGS. 3 and 4 are executed in the physical simulator. Therefore, even under a condition in which the position and posture of the virtual work VW are not used, the CPU 15 can update the model M by changing the state of the virtual environment V and giving a reward in a case where the cloth or liquid is picked. Therefore, the present embodiment can also be applied to a work (such as cloth and liquid) whose position and posture cannot be defined.

Figure 5A:
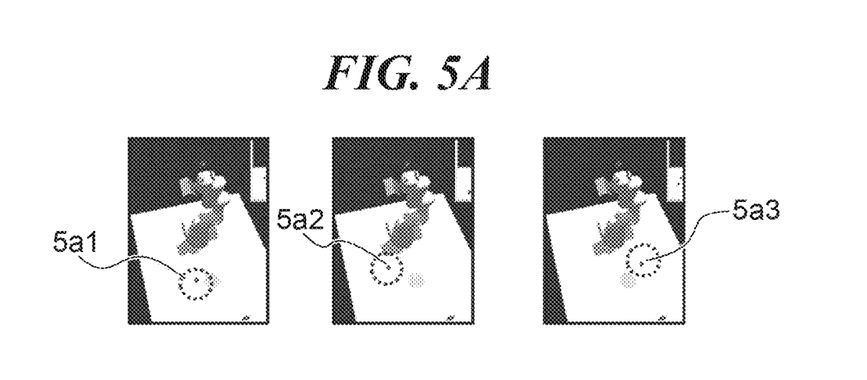
FIGS. 5A to 5C are diagrams showing randomization of various conditions, which is performed when learning is performed in the virtual environment.
Figure 5B:
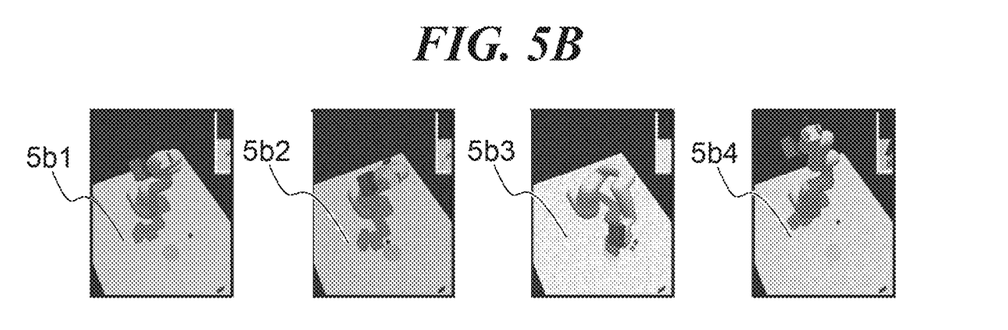
Figure 5C:
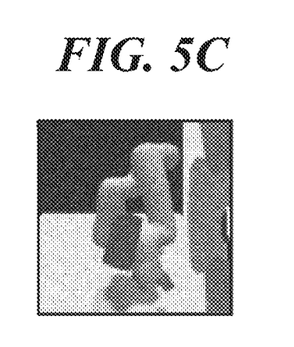

FIGS. 5A to 5C are diagrams showing randomization of various conditions, which is performed when the learning is performed in the virtual environment V. FIG. 5A is a diagram showing randomization of the position and posture of the virtual work VW. Three episodes 5a1, 5a2, and 5a3 indicate start states, in which the virtual work VW is placed in different positions and postures, respectively. The position and posture of the virtual work VW are randomly changed on an episode-by-episode basis. The learning in the virtual environment V is performed while randomly changing the position and posture of the virtual work VW on an episode-by-episode basis. This enables the model M to output a policy having a high possibility of generating a reward without depending on the position and posture of the virtual work VW. That is, it is possible to obtain the model M which can achieve a pick-and-place operation in accordance with various positions and postures of the virtual work VW.

FIG. 5B is a diagram showing randomization of the brightness and color tone of the virtual illumination light. Four episodes 5b1, 5b2, 5b3, and 5b4 each indicate the full view. In the episode 5b1, the full view is dark and illuminated in red. In the episode 5b2, the full view is dark and illuminated in Blue. In the episode 5b3, the full view is bright and illuminated in green. In the episode 5b4, the full view has an intermediate brightness and is illuminated in white. The brightness and color tone of the images photographed by the virtual global camera VC1 and the virtual on-hand camera VC2 are different in respective trials. The learning in the virtual environment V is performed while randomly changing the brightness and color tone of the virtual illumination light for each episode. This enables the model M to output a policy having a high possibility of generating a reward without depending on the brightness and color tone of the full view. That is, it is possible to obtain the model M which can achieve a pick-and-place operation in accordance with the various brightness and color tones of the full view.

FIG. 5C is a diagram showing randomization of the input image input to the model M. The input image is an image generated by connecting images photographed by the virtual global camera VC1 and the virtual on-hand camera VC2, and further applying noise to the connected image. For example, the CPU 15 applies white noise having approximately 30% of a difference between upper and lower limits of the pixel values, as the standard deviation, to the whole area of the input image. Then, the CPU 15 applies different white noise whenever an input image is generated. The learning in the virtual environment V is performed while randomly changing the noise applied to the input image on an episode-by-episode basis. This enables the model M to output a policy having a high possibility of generating a reward without depending on noise of the camera. That is, it is possible to obtain the model M which can achieve a pick-and-place operation in accordance with various noise given to the camera.

Randomization of various conditions, which is performed when the learning is performed in the virtual environment V, is not limited to the above-described examples. For example, the CPU 15 may perform small randomization of the positions and postures of the virtual arm VA, the virtual global camera VC1, and the virtual on-hand camera VC2. Further, the CPU 15 may randomize textures of all objects included in the input image. In this case, the CPU 15 randomly changes the color and feel of the texture of each object. The CPU 15 performs randomization of the various conditions when the learning is performed in the virtual environment V, whereby generalization performance of the model M is increased. The generalization performance is an index indicating whether or not it is possible to output a condition having a high possibility of generating a reward with respect to an unknown input which has not been experienced in the learning. By using the above-described model M having the high generalization performance, it is possible to achieve the same task in the real environment R as that in the virtual environment V.

Figure 6:
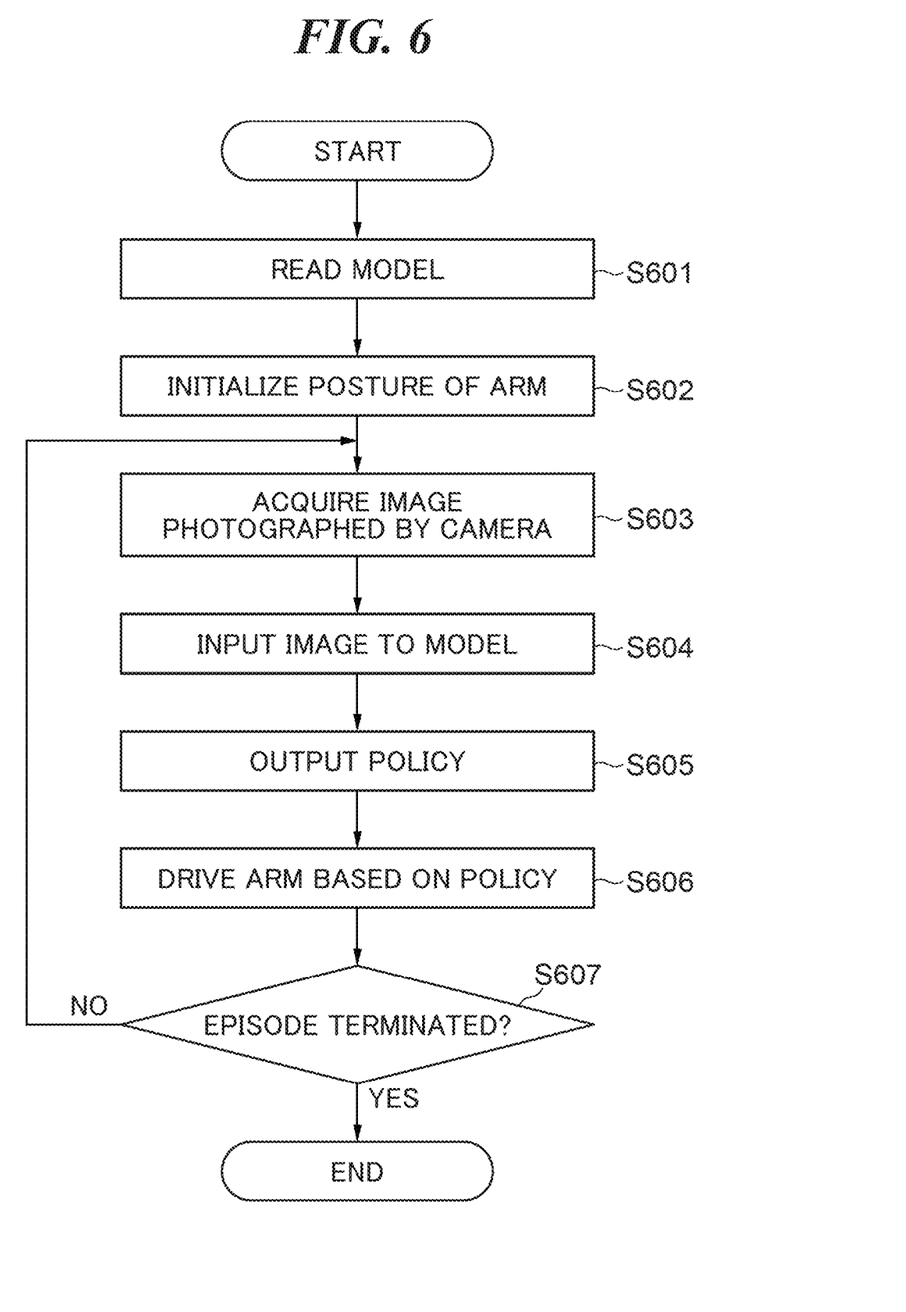
FIG. 6 is a flowchart of a reasoning process in a real environment.

FIG. 6 is a flowchart of the reasoning process in the real environment R. The CPU 15 reads the model M using the learning framework (step S601). The model M has been obtained by the teaming in the virtual environment V. Then, the CPU 15 initializes the posture of the arm A (step S602). With this, the arm A in the real environment R is set to substantially the same initial state (initial posture) as in the virtual arm VA. Then, the CPU 15 acquires an image photographed by the camera by reducing the size of images photographed by the global camera C1 and the on-hand camera C2 and connecting the images (step S603). The CPU 15 inputs the image generated in the step S603 to the model M (step S604). With this, for example, the CPU 15 causes the GPU 16 to perform forward propagation calculation for the neural networks using the input of the image. Then, the GPU 16 outputs a policy as a result of the calculation performed by the model M using the input of the image (step S605). This policy is the same type as the policy obtained by the learning in the virtual environment V.

The CPU 15 performs control for changing the posture of the arm A by driving the arm A based on the policy as the output result from the model M (step S606). The CPU 15 selects a change of the posture of the arm A, i.e. the driving of each of any of the driving shafts of the arm A in the positive or negative direction in proportion to the selection probability indicated in the policy. The CPU 15 determines whether or not the episode is terminated (step S607). The CPU 15 may determine whether or not the episode is terminated based on whether or not the task performed by the arm A with respect to the work W is completed, or based on whether or not the episode has been executed a predetermined number of times. If the answer to the question of the step S607 is negative (NO), the flow returns to the step S603. If the answer to the question of the step S607 is affirmative (YES), the present process is terminated.

As described above, the model M has the generalization performance which can also be used in the real environment R. That is, the model M has performed learning in the virtual environment V such that it is also applicable to the real environment R. Therefore, the robot controller 10 can control the arm A of the robot 11 using the model M without using the position and the posture of the work W in the real environment R, and further, without using inverse kinematics and an operation plan. Therefore, in the present embodiment, there is no occurrence of a driving error of the arm A based on inverse kinematics and an operation plan. Further, the present embodiment can also be easily applied to a task requiring highly accurate driving, such as a task of picking a small work, and further can also be applied to a case where the work is e.g. cloth or liquid whose intermediate values of the position and posture cannot be defined. Therefore, according to the present embodiment, it is possible to control a robot by automatically obtaining a controller capable of suitably controlling a wide range of robots without requiring a specialist, such as a robotics engineer.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-222170, filed Dec. 9, 2019, which is hereby incorporated by reference herein in its entirety.

What is claimed is:
1. A robot controller that controls a robot, which has an arm having multiple joints, the robot controller comprising:
(i) one or more memories configured to store computer-executable instructions and one or more processors configured to execute the computer-executable instructions stored in the one or more memories, (ii) one or more integrated circuits, or both (i) and (ii) that implement:
an acquisition unit configured to acquire an image from an image capturing apparatus that photographs an environment including the robot; and
a driving unit configured to drive the robot based on an output result obtained by inputting the image to a neural network,
wherein the neural network is updated according to a reward generated in a case where a plurality of virtual images photographed while changing an environmental condition of a virtual environment generated by virtualizing the environment and a state of a virtual robot are input to the neural network, and a policy of the virtual robot, which is output from the neural network, satisfies a predetermined condition, and wherein the policy relates to an action of the arm, the action indicating respective driving amounts of the multiple joints.

2. The robot controller according to claim 1, wherein the neural network includes a convolution neural network and a recursive neural network.

3. The robot controller according to claim 1, wherein the policy is a set of a plurality of actions of the virtual robot and respective selection probabilities of the plurality of actions.

4. The robot controller according to claim 3, wherein the neural network is updated such that a selection probability of an action with which the reward has been obtained is increased.

5. The robot controller according to claim 1, wherein the reward is different according to the predetermined condition.

6. The robot controller according to claim 1, wherein noise is applied to the virtual image.

7. The robot controller according to claim 6, wherein the noise is randomly changed on an episode-by-episode basis.

8. The robot controller according to claim 1, wherein the environmental condition includes one or both of a brightness and a color tone of virtual illumination light in the virtual environment.

9. The robot controller according to claim 8, wherein the brightness or the color tone is randomly changed on an episode-by-episode basis.

10. The robot controller according to claim 1, wherein the environmental condition includes textures of a plurality of objects included in the virtual environment.

11. The robot controller according to claim 1, wherein the robot has the arm that holds a work, and the virtual robot has a virtual arm that holds a virtual work.

12. The robot controller according to claim 11, wherein the reward is generated according to a distance between the virtual work and a virtual gripping portion mounted to the virtual arm.

13. The robot controller according to claim 11, wherein the virtual robot is capable of lifting up the virtual work and placing the virtual work in a predetermined area in the virtual environment.

14. The robot controller according to claim 11, wherein a position and a posture of the virtual work are randomly changed on an episode-by episode basis.

15. The robot controller according to claim 11, wherein the work is cloth or liquid.

16. A learned model, comprising:
one or more memories configured to store computer-executable instructions; and
one or more processors configured to execute the computer-executable instructions stored in the one or more memories to acquire the learned model that is acquired by updating a neural network according to a reward generated in a case where a plurality of virtual images photographed while changing an environmental condition of a virtual environment generated by virtualizing an environment including a robot, which has an arm having multiple joints, and a state of a virtual robot are input to the neural network, and a policy of the virtual robot, which is output from the neural network, satisfies a predetermined condition,
wherein the policy relates to an action of the arm, the action indicating respective driving amounts of the multiple joints.

17. A method of controlling a robot, which has an arm having multiple joints, the method comprising:
acquiring an image from an image capturing apparatus that photographs an environment including the robot;
driving the robot based on an output result obtained by inputting the image to a neural network; and
updating the neural network according to a reward generated in a case where virtual images photographed while changing an environmental condition of a virtual environment generated by virtualizing the environment and a state of a virtual robot are input to the neural network, and a policy of the virtual robot, which is output from the neural network, satisfies a predetermined condition, and
wherein the policy relates to an action of the arm, the action indicating respective driving amounts of the multiple joints.

18. A non-transitory computer-readable storage medium storing a computer-executable program for executing a method of controlling a robot, which has an arm having multiple joints,
wherein the method comprises:
acquiring an image from an image capturing apparatus that photographs an environment including the robot;
driving the robot based on an output result obtained by inputting the image to a neural network; and
updating the neural network according to a reward generated in a case where virtual images photographed while changing an environmental condition of a virtual environment generated by virtualizing the environment and a state of a virtual robot are input to the neural network, and a policy of the virtual robot, which is output from the neural network, satisfies a predetermined condition, and
wherein the policy relates to an action of the arm, the action indicating respective driving amounts of the multiple joints.

* * * * *